May 25, 1926. 1,586,105

J. L. L. A. A. MOULET

PIPE COUPLING

Filed March 21, 1923

INVENTOR:
Jean Louis Leon Alexandre
Albert Moulet
BY: Francis E. Boyce
ATTORNEY

Patented May 25, 1926.

1,586,105

UNITED STATES PATENT OFFICE.

JEAN LOUIS LÉON ALEXANDRE ALBERT MOULET, OF PARIS, FRANCE.

PIPE COUPLING.

Application filed March 21, 1923. Serial No. 626,507.

The present invention has for its object a pipe coupling adapted for the fluid-tight-coupling of a smooth pipe to any element, or two smooth pipes together.

This coupling is charactrized in that it is composed of a sleeve containing packing made of a plastic or elastic substance covered with an envelope of a malleable metal. A stuffing box gland longitudinally split serves to press the substance of the packing which swells out its metallic envelope and causes it to fit tightly in the sleeve and the pipe to be coupled, thus obtaining an absolutely tight joint. The reaction of the effort will open the split gland which presses strongly against the inner wall of the sleeve, thus obviating all improper loosening, and this by reason of the suitable inclination of the contact surface of the gland with an intermediate ring or with the packing itself, according to the degree of flexibility desired.

This coupling therefore has the advantage of not becoming loosened by jarring, and further, it reduces the effect of jarring upon the pipe itself, since it affords a break in its rigidity. Again, the surfaces in contact with the contained fluid are exclusively metallic, and this allows the use of the coupling for special liquids having a destructive action on the plastic packing in general use.

In the accompanying drawing which shows by way of example certain forms of construction of the invention:

Figure 1:
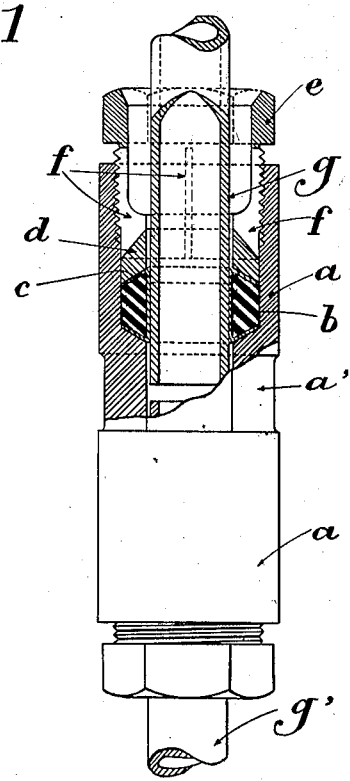
Fig. 1 is an external view, with parts broken away, of a coupling disposed to connect the end of two pipes, the pressing being effected by a screw-threaded gland.

As observed in Fig. 1, the apparatus consists of a sleeve $a$ containing packing constituted by a plastic or an elastic substance $b$ (india-rubber for example) wholly or partially surrounded by a metallic covering $c$ which is malleable, having a relatively small thickness (made of lead or anti-friction metal for example). This packing is succeeded by a rigid ring of bevelled shape $d$ serving to distribute over the packing the pressure of a gland $e$ which can be controlled by a wrench from the outside.

The gland $e$ is screwed by a screw-threaded part into the sleeve $a$ in which a certain number of longitudinal slots $f$ communicating with the ring are formed. These pieces have a longitudinal bore to give passages to the pipe, with a determined play.

The assembling is performed as follows: After inserting the end of the tube $g$ to a suitable depth, one presses in the gland $e$ and it pushes upon the ring $d$ which bears upon the packing. This is done by holding the sleeve $a$ with a wrench at the hexagonal part $a'$ formed in the thickness of said sleeve, which prevents any slipping of the sleeve in the wrench.

The plastic or elastic substance $b$ of the packing is gradually driven from the periphery to the interior, thus causing its metallic envelope $c$ to be drawn, so as to coincide exactly with the shape of the tube $g$, which is thus held fast in a tight manner and without rigidity; the packing, which alone holds the pipe, preserves its flexibility and a certain aptitude for distortion, due to the play allowed between the tube and the other members. The reaction of the effort exerted in order to obtain the pressing will open the gland $e$ and it will make very close contact with the inner wall of the sleeve $a$, thus obtaining in an automatic manner an elastic braking which is unaffected by jarring.

Two arrangements similar to the one described, disposed in a single sleeve $a$ (Fig. 1) will enable the connection of two pipes $g$ and $g'$ end to end.

Figure 2:
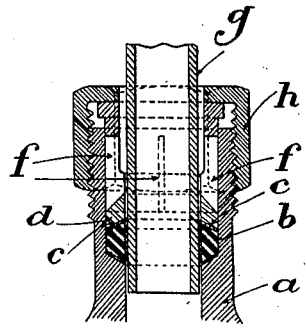
Fig. 2 shows in diametral section either the coupling of a pipe with a sleeve analogous to the one shown in Fig. 1, or the coupling of a pipe with a tank of any kind, the pressing of the gland being effected by an independent nut.
Figure 3:
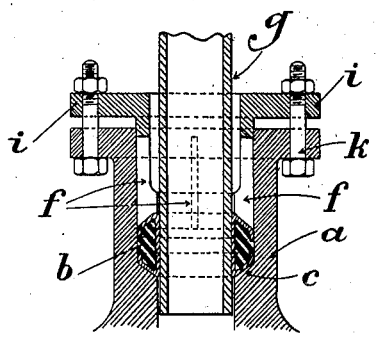
Fig. 3 is a modification in which the gland has a flange, whilst the metal surrounding the packing is strong enough to dispense with the use of an intermediate ring. This arrangement can be used as a stuffing box.

Obviously, the gland $e$ may be smooth instead of screw-threaded, and the pressing is effected either by a separate nut $h$ (Fig. 2) or by the flanges $i$ and bolts $k$ (Fig. 3) or in like manner.

The ring $d$ plays an accessory part, and the same effect can be had by the direct action of the gland $e$ on the packing (Fig. 3); for this, it suffices that the metallic envelope $c$ of the packing shall be strong enough not to be damaged by pressure or friction; this form of construction is chiefly used in cases where a less degree of flexibility is sufficient.

Various constructional modifications in detail can obviously be made in the arrangements set forth without for this reason departing from the spirit of the invention.

Having now described my invention, what I claim as new and desire to secure by Letters Patent is:

A coupling and packing device for smooth cylindrical members comprising in combination a body, cylindrical members extending through said body, a U section sleeve made of soft metal located between said cylindrical members and said body, said sleeve having a thin wall and being open along the outer cylindrical face thereof, a yieldable packing ring of plastic material filling said sleeve, a tubular gland having longitudinal slots along a portion of the wall thereof, said slots forming elastic tongues between them, said gland having a conical and concave pressing end face, an intermediate ring between said gland and said sleeve and having a conical and convex face adapted to engage the pressing end face of said gland and to cause the lateral extension of said tongues, whereby an elastic braking against the inner face of the body is ensured, and a conical and concave face adapted to engage said sleeve, the bore diameter of said intermediate ring and said sleeve being greater than the diameter of said cylindrical members whereby an angular displacement of said cylindrical members relatively to one another is allowed.

In testimony whereof I have signed my name to this specification.

JEAN LOUIS LÉON ALEXANDRE ALBERT MOULET.